(12) United States Patent
Hammer

(10) Patent No.: US 8,016,227 B2
(45) Date of Patent: Sep. 13, 2011

(54) NON-HANDED ENGINE COWL DOORS FOR FUSELAGE MOUNTED TURBINE ENGINES

(75) Inventor: Mike Hammer, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1032 days.

(21) Appl. No.: 12/020,843

(22) Filed: Jan. 28, 2008

(65) Prior Publication Data

US 2009/0189013 A1     Jul. 30, 2009

(51) Int. Cl.
*B64D 29/00* (2006.01)
*B64D 31/00* (2006.01)
*B64D 33/00* (2006.01)
*B64D 35/00* (2006.01)

(52) U.S. Cl. ............... 244/53 R; 244/129.4; 244/110 B; 60/226.2; 60/798

(58) Field of Classification Search ................ 244/53 R, 244/129.4, 110 B, 55, 54; 60/226.2, 798
See application file for complete search history.

(56) References Cited

U.S. PATENT DOCUMENTS

| 4,044,973 | A | * | 8/1977 | Moorehead | 244/54 |
| 4,585,189 | A | * | 4/1986 | Buxton | 244/54 |
| 5,863,014 | A | | 1/1999 | Standish | |
| 6,869,046 | B2 | * | 3/2005 | McEvoy | 244/54 |
| 7,484,354 | B2 | * | 2/2009 | Stretton | 60/226.1 |
| 2003/0102405 | A1 | * | 6/2003 | McEvoy | 244/54 |

* cited by examiner

*Primary Examiner* — Tien Dinh
*Assistant Examiner* — Philip J Bonzell
(74) *Attorney, Agent, or Firm* — Ingrassia Fisher & Lorenz, P.C.

(57) ABSTRACT

An engine cowl door assembly is provided for fuselage mounted turbine engines to minimize manufacturing costs and part counts. In one embodiment, the engine cowl door assembly includes at least one non-handed engine cowl door, a pylon apron coupled to the fuselage of an aircraft and providing an attachment point for a first portion of the engine cowl door and a fairing coupled to the turbine engine and providing a latching point for a second portion of the engine cowl door to the turbine engine. The pylon apron, positioned on an inboard side of the turbine engine, and the fairing, positioned on an outboard side of the turbine engine, are identically shaped to provide interchangeability of the engine cowl door from a turbine engine mounted on a first side of an aircraft fuselage to a turbine engine mounted on a opposed second side of an aircraft fuselage.

20 Claims, 3 Drawing Sheets

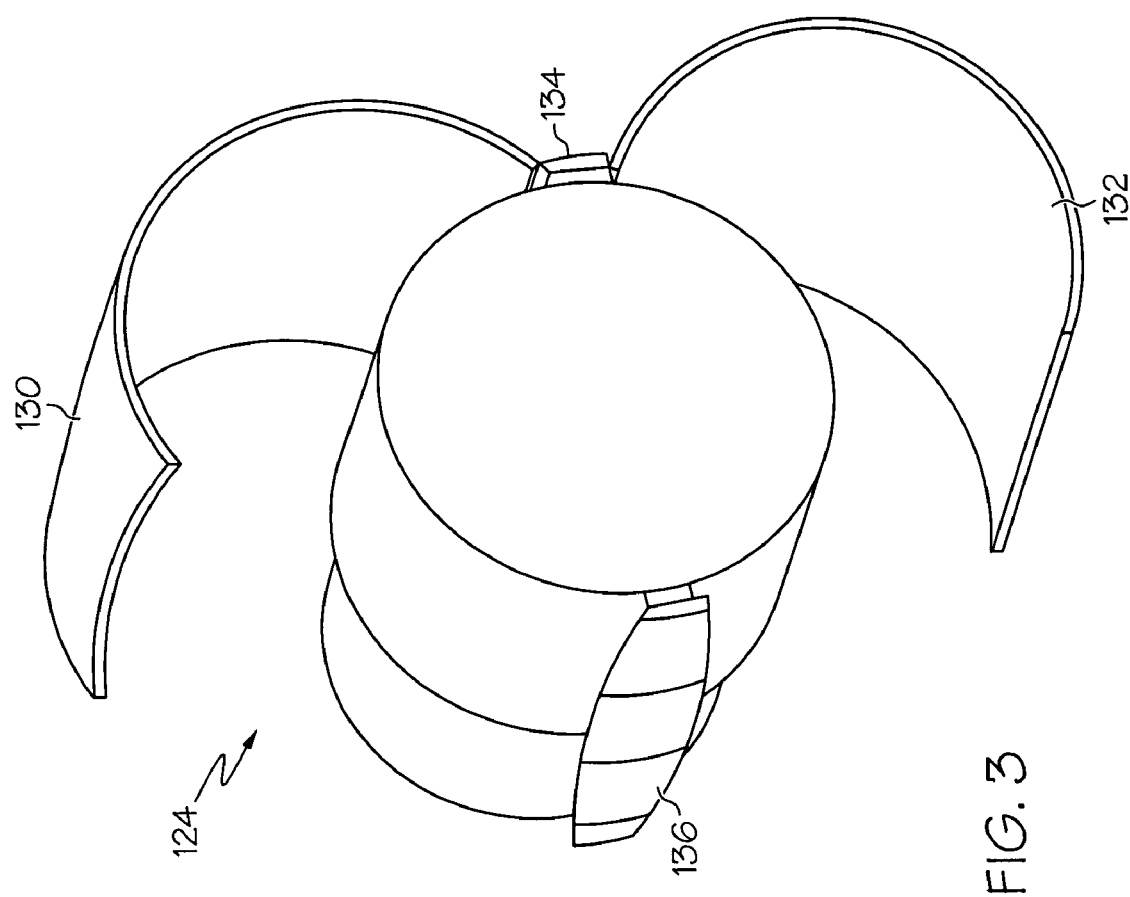

NON-HANDED ENGINE COWL DOORS FOR FUSELAGE MOUNTED TURBINE ENGINES

TECHNICAL FIELD

The inventive subject matter relates to engine cowl doors and, more particularly, to the design of engine cowl doors for fuselage mounted gas turbine engines.

BACKGROUND

Turbine engines are used as the primary power source for many types of aircraft. The engines are also auxiliary power sources that drive air compressors, hydraulic pumps, and industrial gas turbine (IGT) power generation. Further, the power from turbine engines is used for stationary power supplies such as backup electrical generators for hospitals and the like.

Most turbine engines generally follow the same basic power generation procedure. Compressed air generated by axial and/or radial compressors is mixed with fuel and burned, and the expanding hot combustion gases are directed against stationary turbine vanes in the engine. The vanes turn the high velocity gas flow partially sideways to impinge on a plurality of turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Other engines use this power to turn one or more propellers, fans, electrical generators, or other devices.

In aircraft applications, a first turbine engine is typically mounted on the right hand side of the fuselage and a second turbine engine is typically mounted on the left hand side of the fuselage. The gas turbine engines on many aircraft are housed within an engine case, or nacelle. Typically, the engine nacelle includes one or more cowl doors that provide maintenance personnel with an access to the interior of the nacelle to repair and maintain the engine. Historically, aircraft with fuselage mounted turbine gas engines include at a minimum, four separate and distinctly different engine cowl doors per aircraft: a set of two on the engine located on the left hand side of the fuselage and a set of two on the engine located on the right hand side of the fuselage. Each set of engine cowl doors are fabricated to include an upper door and a lower door. More particularly, an aircraft having two fuselage mounted gas turbine engines would include: (i) one left hand side, upper engine cowl door; (ii) one left hand side, lower engine cowl door; (iii) one right hand side, upper engine cowl door; and (iv) one right hand side, lower engine cowl door. Due to the complexity of the plurality of engine cowl doors, each door is costly to design, tool, fabricate, inspect and test, thus driving up the overall non-recurring and recurring cost to manufacture the nacelle for each turbine engine. Four different engine cowl doors mean four different tools and processes, resulting in higher fabricating costs. For example, four bonding tools for composite doors or four forming tools for metal doors, and four assembly tools for metal and composite doors.

It should thus be appreciated from the above that it would be desirable to provide a fuselage mounted gas turbine engine including a plurality of non-handed engine cowl doors to minimize the number of engine cowl door designs required per aircraft. Furthermore, other desirable features and characteristics of the present invention will become apparent from the subsequent detailed description of the invention and the appended claims, taken in conjunction with the accompanying drawings and this background of the invention.

BRIEF SUMMARY

The inventive subject matter provides a fuselage mounted gas turbine engine including at least one non-handed engine cowl door.

In one embodiment, and by way of example only, provided is an engine cowl door assembly for a fuselage mounted turbine engine. The assembly comprises at least one non-handed engine cowl door, a pylon apron, and a fairing. The pylon apron is coupled to the fuselage of an aircraft and provides an attachment point for a first portion of the at least one engine cowl door. The pylon apron is positioned on an inboard side of the fuselage mounted turbine engine. The fairing is coupled to the fuselage mounted turbine engine and provides a latching point for a second portion of the at least one engine cowl door to the fuselage mounted turbine engine. The fairing is positioned on an outboard side of the fuselage mounted turbine engine. The pylon apron and the fairing are identically shaped to provide interchangeability of the at least one non-handed engine cowl door from the fuselage mounted turbine engine mounted on a first side of an aircraft fuselage to a fuselage mounted turbine engine mounted on a opposed second side of the aircraft fuselage.

In another embodiment, and by way of example only, there is provided an engine cowl door assembly for fuselage mounted turbine engines comprising a turbine engine nacelle, an inboard pylon apron, and an outboard fairing. The turbine engine nacelle is mounted to a fuselage and includes at least one non-handed engine cowl door. The inboard pylon apron is coupled to the turbine engine nacelle and provides an attachment point for an inboard portion of the at least one non-handed engine cowl door. The inboard pylon apron is positioned on an inboard side of a turbine engine. The outboard fairing is coupled to the turbine engine nacelle and provides a latching point for an outboard portion of the at least one engine cowl door to the turbine engine nacelle. The outboard fairing is positioned on an outboard side of the turbine engine. The inboard pylon apron and the outboard fairing are identically shaped to provide interchangeability of the at least one non-handed engine cowl door from a turbine engine mounted on a first side of an aircraft fuselage to a turbine engine mounted on a opposed second side of the aircraft fuselage.

In still another embodiment, and by way of example only, there is provided an aircraft fuselage mounted turbine engine assembly comprising a turbine engine, an inboard pylon apron, and an outboard fairing. The turbine engine includes a turbine engine nacelle coupled to an aircraft fuselage. The turbine engine nacelle includes at least one non-handed engine cowl door. The inboard pylon apron is coupled to the turbine engine nacelle and provides an attachment point for an inboard portion of the at least one non-handed engine cowl door. The inboard pylon apron is positioned on an inboard side of the turbine engine. The outboard fairing is coupled to the turbine engine nacelle and provides a latching point for an outboard portion of the at least one engine cowl door to the turbine engine nacelle. The outboard fairing is positioned on an outboard side of the turbine engine. The inboard pylon apron and the outboard fairing are identically shaped to provide interchangeability of the at least one non-handed engine cowl door from a turbine engine mounted on a first side of the aircraft fuselage to a turbine engine mounted on a opposed second side of the aircraft fuselage.

Other independent features and advantages of the preferred assemblies and methods will become apparent from the fol-

BRIEF DESCRIPTION OF THE DRAWINGS

FIG. 3 is an enlarged perspective view of a gas turbine engine of FIG. 2, including a plurality of non-handed engine cowl doors, according to an embodiment.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
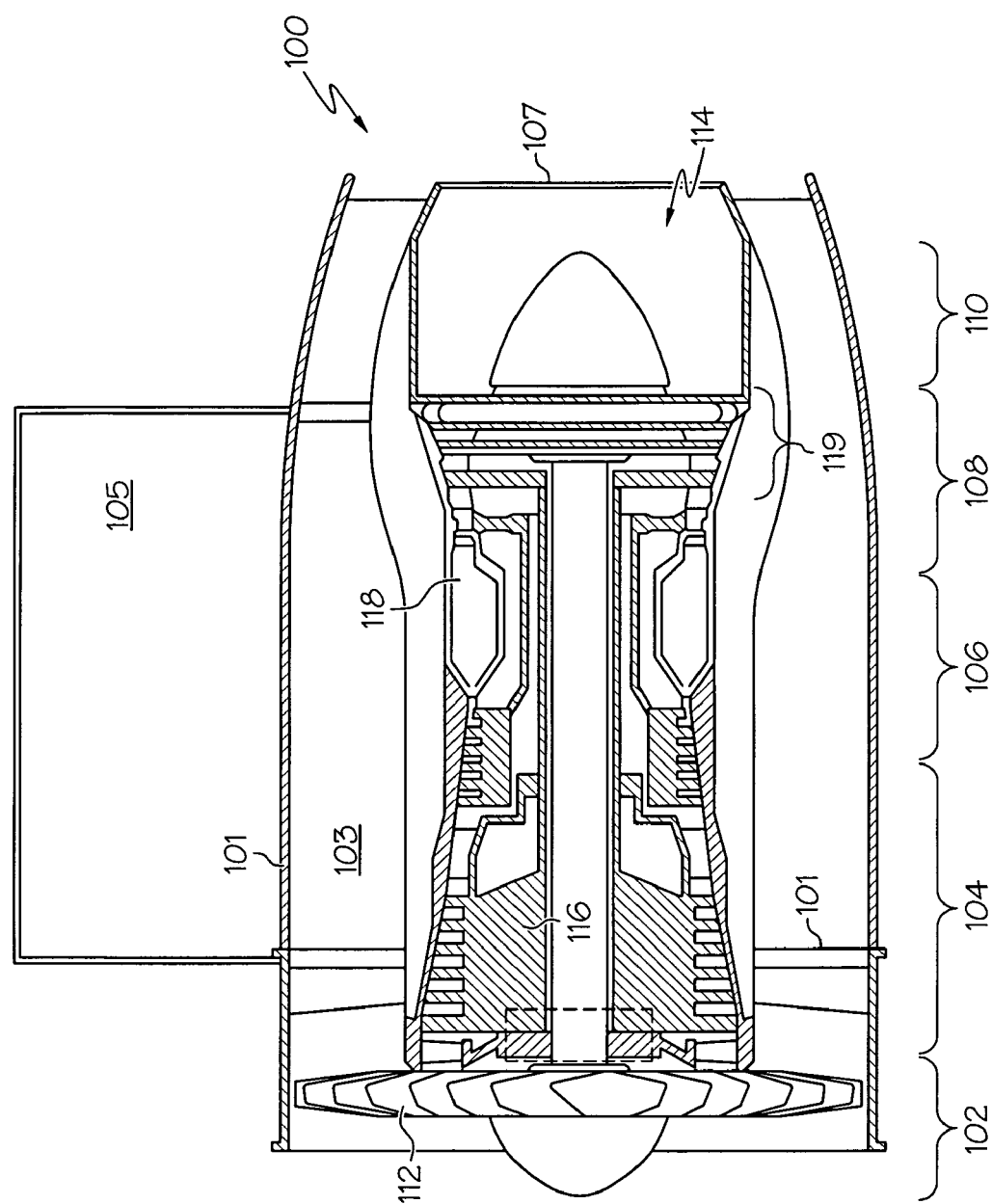
FIG. 1 is a simplified, cross-sectional view of a typical gas turbine engine, according to an embodiment.

FIG. 1 is a simplified, cross-sectional view of a gas turbine engine 100, according to an embodiment. The gas turbine engine 100 includes a fan section 102, a compressor section 104, a combustion section 106, a turbine section 108, and an exhaust section 110. The gas turbine engine 100 may be disposed in an engine case, also referred to as a nacelle 101. The nacelle 101 includes one or more engine cowl door assemblies that may be opened to provide access to various portions of the engine. For example, the nacelle 101 may include a plurality of engine cowl doors 105 (of which only one is shown in an open position), one on each side of the engine nacelle 101, that may be opened to provide access to at least one of the engine fan section 102, the compressor section 104, the combustion section 106, the turbine section 108, and/or the exhaust section 110. It will be appreciated that the gas turbine engine 100, depending upon its configuration, may include additional engine cowl doors beyond those explicitly depicted and described. The plurality of engine cowl doors 105, attach together around the outer diameter of the gas turbine engine 100 to form a portion of the completely enclosed nacelle 101. This provides protection for the exterior of the gas turbine engine 100 and accessories, and provides a smooth, unrestricted airflow around the gas turbine engine 100 during flight.

With regard to the gas turbine engine 100, the fan section 102 may include a fan 112, which draws air into the fan section 102 and accelerates it. A fraction of the accelerated air exhausted from the fan 112 is directed through a bypass section 103 to provide a forward thrust. The remaining fraction of air exhausted from the fan 112 is directed into the compressor section 104. The bypass section 103 surrounds the core engine portions (such as the compressor section 104, the combustion section 106, the turbine section 108, and/or the exhaust section 110) and terminates at a nozzle 107 located at the outlet for exhaust gas from the gas turbine engine 100. The bypass section 103 is typically composed of a plurality of separable duct sections (not shown) on each side from the front to the rear of the gas turbine engine 100. The duct sections may be removable, in part or whole, as necessary when the core portion of the gas turbine engine 100 needs maintenance.

The compressor section 104 may include series of compressors 116, which raise the pressure of the air directed into it from the fan 112. The compressors 116 may direct the compressed air into the combustion section 106. In the combustion section 106, which includes an annular combustor 118, the high pressure air is mixed with fuel and combusted. The combusted air is then directed into the turbine section 108.

The turbine section 108 may include a series of turbines 119, which may be disposed in axial flow series. The combusted air from the combustion section 106 expands through the turbines 119, causing them to rotate. The air is then exhausted through a propulsion nozzle 114 disposed in the exhaust section 110, providing additional forward thrust.

As previously stated, the gas turbine engine 100 may require maintenance, or the like, during its lifetime, and at least one non-handed engine cowl door, such as the engine cowl door 105, provides for ease in access to the gas turbine engine 100.

Figure 2:
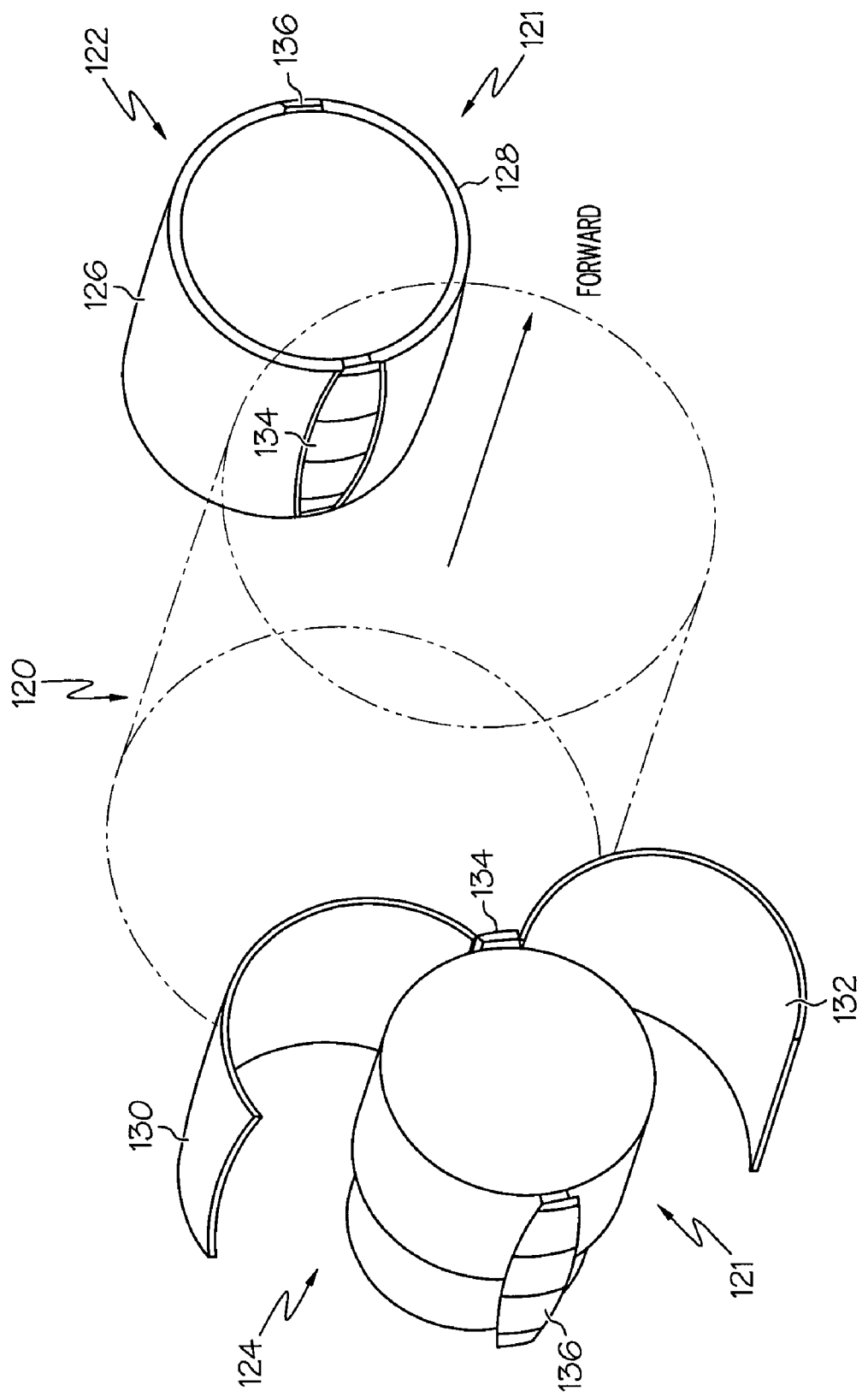
FIG. 2 is a schematic perspective view of a fuselage having mounted thereto a plurality of gas turbine engines in which non-handed engine cowl doors are implemented, according to an embodiment.

Turning now to FIG. 2, illustrated is a schematic perspective view of a fuselage having mounted thereto a plurality of gas turbine engines in which a plurality of non-handed engine cowl doors are implemented. More specifically, illustrated is a fuselage 120 having mounted thereto a plurality of gas turbine engines 121, generally similar to gas turbine engine 100 of FIG. 1. In this particular embodiment, a first gas turbine engine 122, also referred to as a left-hand turbine engine, is mounted to the fuselage 120. In addition, a second gas turbine engine 124, also referred to as a right-hand turbine engine is mounted to the fuselage 120. The fuselage 120 is illustrated schematically and having a directional arrow to indicate the forward direction of the aircraft. In addition, it should be understood that the terms "right hand" and "left hand" depict the side of the fuselage 120 being referred to as related to the forward directional movement of the aircraft. The first and second gas turbine engines 122 and 124 are each mounted to the fuselage 120 as is generally well known in the aircraft industry. In the depicted embodiment, the first gas turbine engine 122 includes an upper engine cowl door 126 and a lower engine cowl door 128, both depicted in a closed position. The second gas turbine engine 124 includes an upper engine cowl door 130 and a lower engine cowl door 132, both depicted in an open position, as further illustrated in a closeup view in FIG. 3. Each of the engine cowl doors 126, 128, 130 and 132 may be moved between an open and a closed position using a cowl door operating control system (not shown). The control system would typically include a plurality of actuator assemblies and one or more controllers coupled to at least one of the engine cowl doors 126, 128, 130 and 132. A plurality of inboard pylon aprons 134 couple each of the engine cowl doors 126, 128, 130 and 132 to the fuselage 120. More particularly, the pylon aprons 134 provide attachment points for the engine cowl doors 126, 128, 130 and 132. The engine cowl doors 126, 128, 130 and 132 may be attached to the pylon aprons 134 by hinges, or similar mechanical component.

A plurality of outboard fairings or outboard islands 136 are mounted to the gas turbine engine 100, and more particularly the gas turbine engine nacelle 101. Each of the plurality of outboard fairings 136 provides a cover for a gap or space that may be formed between the upper engine cowl doors 126 and 130 and their respective lower engine cowl doors 128 and 132 when in a closed position. In addition, each of the plurality of outboard fairings 136 provides an attachment point for closure of the engine cowl doors 126, 128, 130, and 132. The plurality of outboard fairings 136 provide for a reduction in drag on the aircraft during flight. Each of the outboard fairings 136 is formed in a shape similar to the pylon aprons 134 and symmetrical about the fuselage 120. The similarity in the shapes of the outboard fairings 136 and the inboard pylon aprons 134 allows for the engine cowl doors 126 and 128 on the left hand side of the fuselage 120 to have the same shape, respectively, as the engine cowl doors 130 and 132 on the right hand side of the fuselage 120. Hence, the upper engine cowl doors 126 and 130 are similarly shaped and thus interchangeable, and the lower engine cowl doors 128 and 132 are similarly shaped and thus interchangeable. This allows for usage of the doors on both the left and right engines thus reducing both the development and manufacturing costs for the engine cowl doors 126, 128, 130 and 132. Accordingly, the engine cowl doors 126, 128, 130 and 132 are described as being non-handed in that the design allows for use on either the right or left hand engines.

Apparatus have now been provided to improve the cost associated with development and manufacturing of engine cowl doors. More specifically, provided is a gas turbine engine that includes non-handed engine cowl doors that may be used on a gas turbine engine mounted to either side of an aircraft fuselage. The non-handed fan cowl doors are designed to be interchangeable thus minimizing the number of designs required for the engine cowl doors. The apparatus may be retrofitted into existing engines.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

I claim:

1. An engine cowl door assembly for a fuselage mounted turbine engine comprising:
    at least one non-handed engine cowl door;
    a pylon apron coupled to the fuselage of an aircraft and providing an attachment point for a first portion of the at least one engine cowl door, the pylon apron positioned on an inboard side of the fuselage mounted turbine engine; and
    a fairing coupled to the fuselage mounted turbine engine and providing a latching point for a second portion of the at least one engine cowl door to the fuselage mounted turbine engine, the fairing positioned on an outboard side of the fuselage mounted turbine engine,
    wherein the pylon apron and the fairing are identically shaped to provide interchangeability of the at least one non-handed engine cowl door from the fuselage mounted turbine engine mounted on a first side of an aircraft fuselage to a fuselage mounted turbine engine mounted on a opposed second side of the aircraft fuselage.

2. The assembly of claim 1, wherein the at least one non-handed engine cowl door is coupled to the pylon apron with a hinge.

3. The assembly of claim 1, wherein the pylon apron and the fairing are identically shaped to provide a matching trim on the first portion of the at least one engine cowl door and on the second portion of the at least one engine cowl door.

4. The assembly of claim 1, wherein the at least one non-handed engine cowl door is formed as a portion of a turbine engine nacelle.

5. The assembly of claim 4, wherein the at least one non-handed engine cowl door comprises an upper non-handed engine cowl door and a lower non-handed engine cowl door.

6. The assembly of claim 5, wherein the upper non-handed engine cowl door is coupled to a first turbine engine mounted on the first side of the aircraft fuselage and interchangeable with an upper non-handed engine cowl door coupled to a second turbine engine mounted on the opposed second side of the aircraft fuselage.

7. The assembly of claim 5, wherein the lower non-handed engine cowl door is coupled to a first turbine engine mounted on the first side of the aircraft fuselage and interchangeable with a lower non-handed engine cowl door coupled to a second turbine engine mounted on the opposed second side of the aircraft fuselage.

8. An engine cowl door assembly for fuselage mounted turbine engines comprising:
    a turbine engine nacelle mounted to a fuselage and including at least one non-handed engine cowl door;
    a inboard pylon apron coupled to the turbine engine nacelle and providing an attachment point for an inboard portion of the at least one non-handed engine cowl door, the inboard pylon apron positioned on an inboard side of a turbine engine; and
    an outboard fairing coupled to the turbine engine nacelle and providing a latching point for an outboard portion of the at least one engine cowl door to the turbine engine nacelle, the outboard fairing positioned on an outboard side of the turbine engine,
    wherein the inboard pylon apron and the outboard fairing are identically shaped to provide interchangeability of the at least one non-handed engine cowl door from a turbine engine mounted on a first side of an aircraft fuselage to a turbine engine mounted on a opposed second side of the aircraft fuselage.

9. The assembly of claim 8, wherein the at least one non-handed engine cowl door is coupled to the inboard pylon apron with a hinge.

10. The assembly of claim 8, wherein the inboard pylon apron and the fairing are identically shaped to provide a matching trim on the inboard portion of the at least one engine cowl door and on the outboard portion of the at least one engine cowl door.

11. The assembly of claim 8, further including an upper non-handed engine cowl door and a lower non-handed engine cowl door.

12. The assembly of claim 11, wherein the upper non-handed engine cowl door is coupled to a first turbine engine mounted on the first side of the aircraft fuselage and interchangeable with an upper non-handed engine cowl door coupled to a second turbine engine mounted on the opposed second side of the aircraft fuselage.

13. The assembly of claim 11, wherein the lower non-handed engine cowl door is coupled to a first turbine engine mounted on the first side of the aircraft fuselage and interchangeable with a lower non-handed engine cowl door coupled to a second turbine engine mounted on the opposed second side of the aircraft fuselage.

14. An aircraft fuselage mounted turbine engine assembly comprising:
    a turbine engine including a turbine engine nacelle coupled to an aircraft fuselage, the turbine engine nacelle including at least one non-handed engine cowl door;

a inboard pylon apron coupled to the turbine engine nacelle and providing an attachment point for an inboard portion of the at least one non-handed engine cowl door, the inboard pylon apron positioned on an inboard side of the turbine engine; and an outboard fairing coupled to the turbine engine nacelle and providing a latching point for an outboard portion of the at least one engine cowl door to the turbine engine nacelle, the outboard fairing positioned on an outboard side of the turbine engine, wherein the inboard pylon apron and the outboard fairing are identically shaped to provide interchangeability of the at least one non-handed engine cowl door from a turbine engine mounted on a first side of the aircraft fuselage to a turbine engine mounted on a opposed second side of the aircraft fuselage.

15. The assembly of claim 14, further including an upper non-handed engine cowl door and a lower non-handed engine cowl door formed as a portion of the turbine engine nacelle.

16. The assembly of claim 14, wherein the at least one non-handed engine cowl door is coupled to the inboard pylon apron with a hinge.

17. The assembly of claim 14, wherein the inboard pylon apron and the outboard fairing are identically shaped to provide a matching trim on the inboard portion of the at least one engine cowl door and on the outboard portion of the at least one engine cowl door.

18. The assembly of claim 14, further including a second turbine engine including a second turbine engine nacelle coupled to an opposed side of the aircraft fuselage, the second turbine engine nacelle including at least one non-handed engine cowl door.

19. The assembly of claim 18, wherein the upper non-handed engine cowl door is coupled to the turbine engine mounted on the first side of the aircraft fuselage and interchangeable with an upper non-handed engine cowl door coupled to the second turbine engine mounted on the opposed second side of the aircraft fuselage.

20. The assembly of claim 18, wherein the lower non-handed engine cowl door is coupled to the turbine engine mounted on the first side of the aircraft fuselage and interchangeable with a lower non-handed engine cowl door coupled to the second turbine engine mounted on the opposed second side of the aircraft fuselage.

* * * * *